United States Patent
Wenzel (10) Patent No.: US 6,880,775 B1
(45) Date of Patent: Apr. 19, 2005

(54) POWERED FISHING REEL

(76) Inventor: Stephen R. Wenzel, 5571 Rte. 9W, Marlboro, NY (US) 12542

(*) Notice: Subject to any disclaimer, the term of this patent is extended or adjusted under 35 U.S.C. 154(b) by 0 days.

(21) Appl. No.: 10/682,053

(22) Filed: Oct. 9, 2003

(51) Int. Cl.[7] ............................................... A01K 89/02
(52) U.S. Cl. ......................................... 242/225; 43/21
(58) Field of Search ................................ 242/223, 225, 242/226; 43/21

(56) References Cited

U.S. PATENT DOCUMENTS

| | | | |
|---|---|---|---|
| 3,459,387 A | * 8/1969 | Miyamae | 242/225 |
| 3,932,954 A | * 1/1976 | Wyroski | 242/225 |
| 4,191,340 A | * 3/1980 | Kubanek | 242/390.1 |
| 4,283,025 A | * 8/1981 | Whisenhunt | 242/250 |
| 4,832,277 A | 5/1989 | Ohtake | |
| 5,088,657 A | 2/1992 | Chen | |
| 5,156,351 A | 10/1992 | Cittadini | |
| D343,672 S | 1/1994 | Kobayashi et al. | |
| 5,397,071 A | 3/1995 | Nambu | |
| 5,878,523 A | 3/1999 | Wenzel | |
| 6,012,665 A | * 1/2000 | Olona | 242/250 |
| 6,056,219 A | * 5/2000 | Barkley | 242/225 |
| 6,449,895 B1 | * 9/2002 | Zabihi | 43/21 |

* cited by examiner

*Primary Examiner*—Emmanuel Marcelo (57) ABSTRACT

A powered fishing reel is described which permits manual operation and powered operation providing the fishing line has no load on it. A hollow shaft with a concentric opening in it drives, by means of gear means, the reel upon which the fishing line is wound. A manual shuttle with a crank handle on it can be inserted into one end of the hollow shaft to rotate the reel. A power shuttle similarly can be inserted into the opposite end of the hollow shaft. A bevel gear on the power shuttle. A transfer shuttle is located between the power shuttle and the manual shuttle and serves to push the manual shuttle with the crank handle out of the hollow shaft. A battery is located in the handle of the fishing rod to power an electric motor mounted in a motor assembly so that the electric motor which through gears and a shaft rotates the bevel gear. The same finger hook slides the power shuttle into the hollow shaft and closes a switch which energizes the electric motor. The engagement between the motor and the gears is sufficiently weak that should a load be placed on the fishing line, the motor assembly pivots away from the gears and the finger hook is released back to the inactive position pulling the power shuttle from the hollow shaft.

12 Claims, 10 Drawing Sheets

POWERED FISHING REEL

BACKGROUND OF THE INVENTION

1. Field of the Invention

This invention relates to fishing reels and more specifically to modification apparatus for powering fishing reels to rewind the fishing reel absent a fish having been caught.

2. Prior Art

Various fishing reels have been developed fo permit the rewinding of the fishing line on the fishing reel by electrical power. Such powered fishing reels are of particular advantage to persons who are physically challenged. One patent which describes such a fishing reel is the Wenzel Patent, U.S. Pat. No. 5,878,523. The powered fishing reel described in this patent uses two intermediary gears to alternate between manual and powered operation. Although the system operates satisfactorily, the resulting fishing reel is a comparatively heavy and cumbersome device.

OBJECTS

The objects of this invention are to provide a powered fishing reel as follows:

A powered fishing reel that can raise a fishing line that is wound on the fishing reel by electrice power.

A powered fishing reel that automatically ceases powered operation when the fishing line is placed under load.

A powered fishing reel that can be alternately manually operated.

A powered fishing reel that is economical and dependable.

A powered fishing reel which is simple to operate.

A powered fishing reel which is comparatively light in weight.

SUMMARY OF THE INVENTION

A powered fishing reel is provided which permits both motorized operation and manual operation of the fishing reel. The powered fishing reel has an enclosure with a spool mounted to rotate on the enclosure. A hollow shaft with a power end and a manual end is mounted to rotate in the enclosure. The hollow shaft has a concentric opening through it. Means connect the hollow shaft with the spool to rotate the spool. A manual shuttle is mounted to slide into and out of the concentric opening at the manual end of the hollow shaft and to engage the hollow shaft to rotate the hollow shaft. A crank handle is mounted on the manual shuttle. A power shuttle is mounted to slide into and out of the concentric opening at the power end of the hollow shaft to rotate the hollow shaft. Means are also provided to remove the manual shuttle from the hollow shaft when the power shuttle engages the hollow shaft. A motor assembly includes an electric motor and an upper member and a mount shaft. The mount shaft is mounted to rotate in the enclosure. A gear assembly is also mounted in the enclosure. The gear assembly is connected to the power shuttle. An electrical circuit includes a switch and a power source. The electrical circuit is connected to the electric motor to energize the electric motor. The electric motor has a power shaft and a gear is mounted on the power shaft. Means are also provided to actuate the switch and engage the gear mounted on the power shaft of the gear assembly and also to engage the power shuttle with the hollow shaft.

DESCRIPTION OF THE NUMERALS

| NUMERAL | DESCRIPTION |
| --- | --- |
| 11 | Fishing Pole |
| 13 | Handle |
| 15 | Mounting Post |
| 17 | Battery |
| 19 | Manual Fishing Reel |
| 21 | Power Assembly |
| 23 | Electric Motor |
| 25 | Spool |
| 27 | Fishing Line |
| 29 | Finger Hook |
| 31 | Hollow Shaft |
| 33 | Bearings |
| 35 | Enclosure |
| 37 | Exterior |
| 39 | Concentric Opening |
| 41 | Two Ends |
| 43 | Power End |
| 45 | Manual End |
| 47 | Power Shuttle |
| 49 | Manual Shuttle |
| 51 | Shift Shuttle |
| 55 | Exterior Surface |
| 57 | Crank Handle |
| 59 | Power Bevel Gear |
| 61 | Shaft Bevel Gear |
| 63 | Shaft |
| 65 | Reduction Gear |
| 67 | Worm Gear |
| 69 | Power Shaft |
| 71 | Motor Assembly |
| 73 | Mount Shaft |
| 75 | Opening |
| 77 | Support Frame |
| 81 | Face Plate |

-continued

| NUMERAL | DESCRIPTION |
| --- | --- |
| 83 | Outer Edge |
| 85 | Two Support Rods |
| 87 | Upper Member |
| 89 | Ends of Support Rods |
| 91 | Edge |
| 93 | Pad |
| 95 | Hub |
| 97 | Contact |
| 99 | Linkage |
| 101 | Pivot Point |
| 103 | Prongs |
| 105 | Linkage Spring |
| 106 | Circuit Board |
| 107 | Switch |
| 108 | Mounting Plate |
| 109 | Notch |
| 111 | Pawl |
| 113 | Switch Plate |

DESCRIPTION OF THE PREFERRED EMBODIMENT

Figure 1:
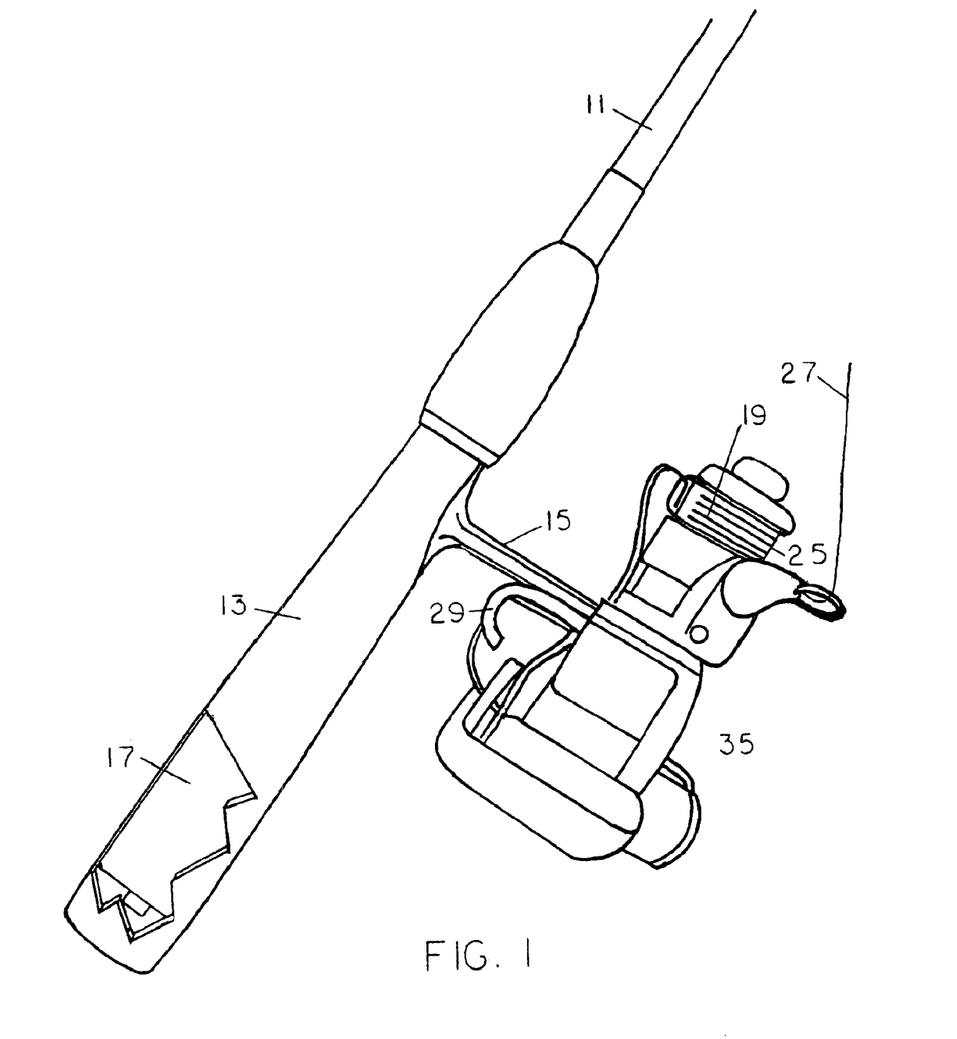
FIG. 1 is a perspective view from the side of the fishing reel showing the fishing reel affixed to a fishing pole with the handle of the fishing pole broken away to show the battery used to supply electrical power.

Referring now to FIG. 1 a fishing pole 11 is shown having a handle 13. The powered fishing reel is mounted on the handle 13 by a mounting post 15. A battery 17 is shown in FIG. 1 mounted in the handle 13. The powered fishing reel is constructed on an exisitng manual fishing reel 19 by adding the power assembly 21 to it. The purpose of the battery 17 is to energize an electric motor 23 as will be subsequently explained herein. The powered fishing reel has the usual spool 25 for winding a fishing line 27 which is raised and lowered by rotation of the spool. A finger hook 29 is shown which when pulled converts the operation of the spool 25 to wind up the fishing line 21 from manual to powered. The finger hook 29 is but one of several devices which could be used to commence powered operation.

Figure 2:
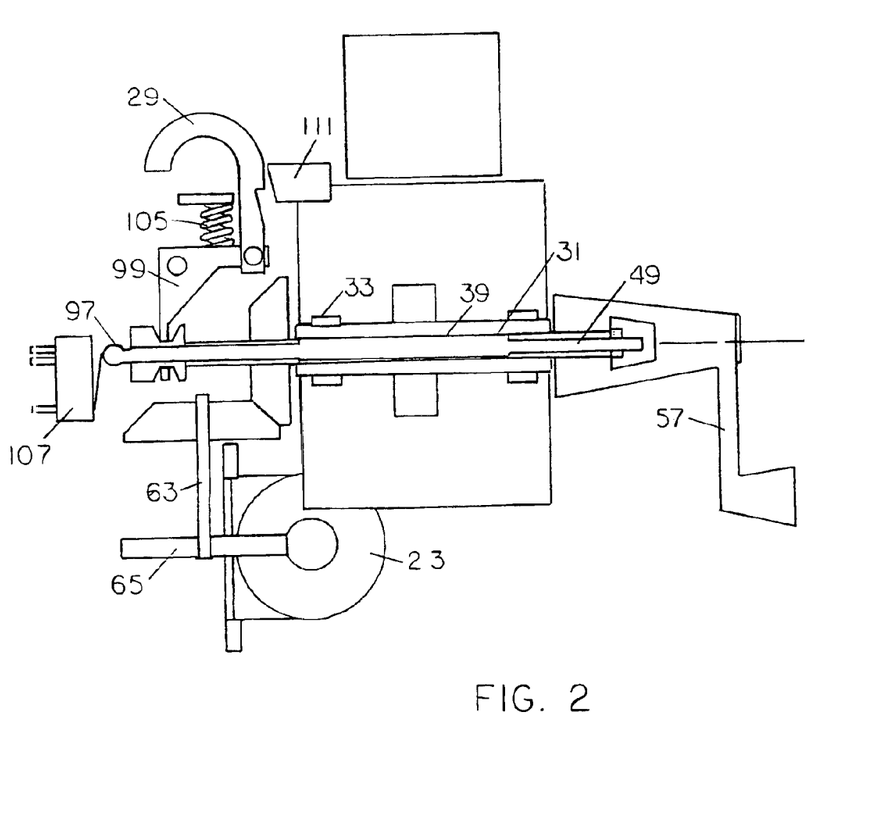
FIG. 2 is a conceptual cross-sectional view showing the fishing reel set for manual operation.
Figure 3:
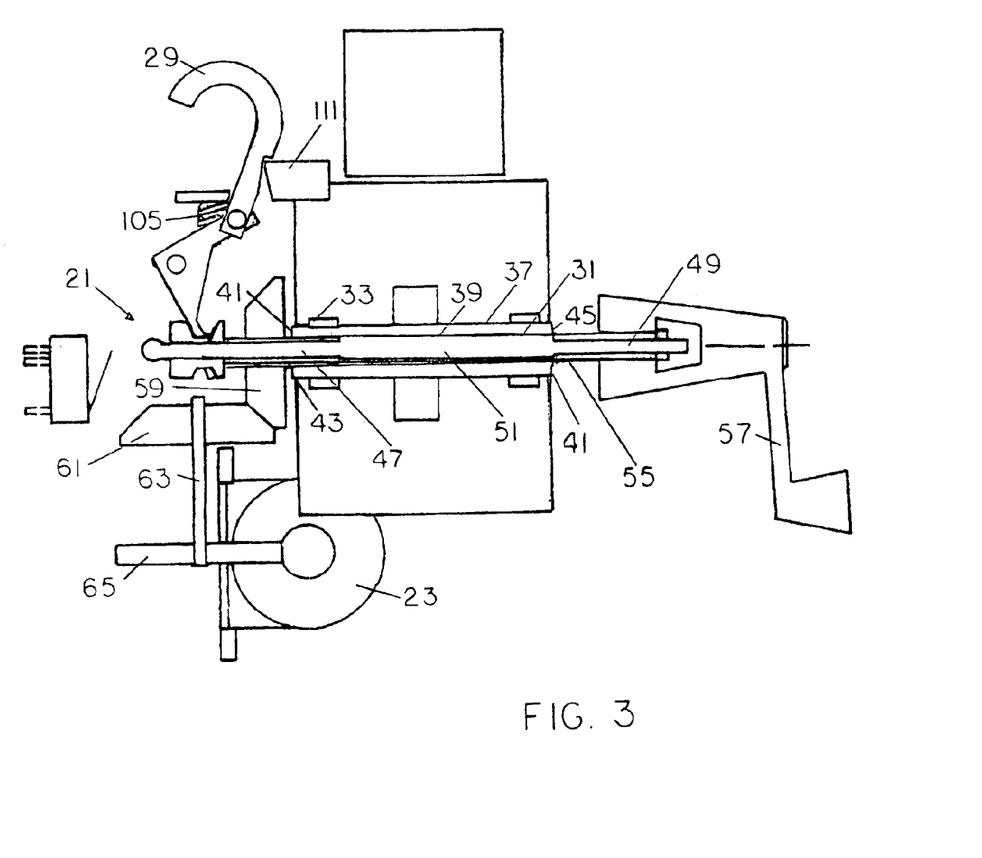
FIG. 3 is a conceptual cross-sectional view similar to FIG. 2 but with the fishing reel set for powered operation.
Figures 4, 5:
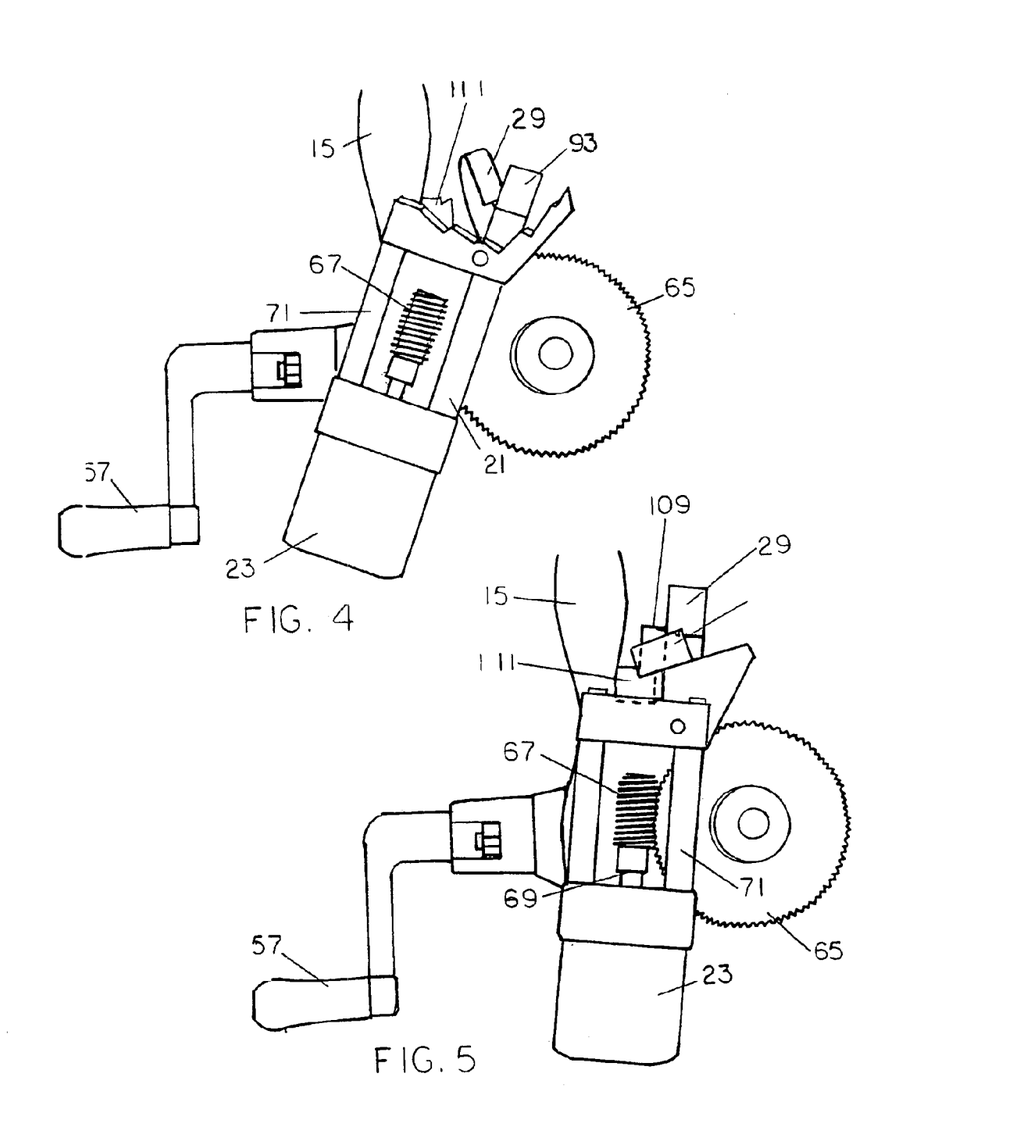
FIG. 4 is a side view of the electric motor and worm gear rotated away from the reduction gear.
FIG. 5 is a side view of the electric motor and worm gear similar to FIG. 4 but with the worm gear engaging the reduction gear.
Figure 5A:
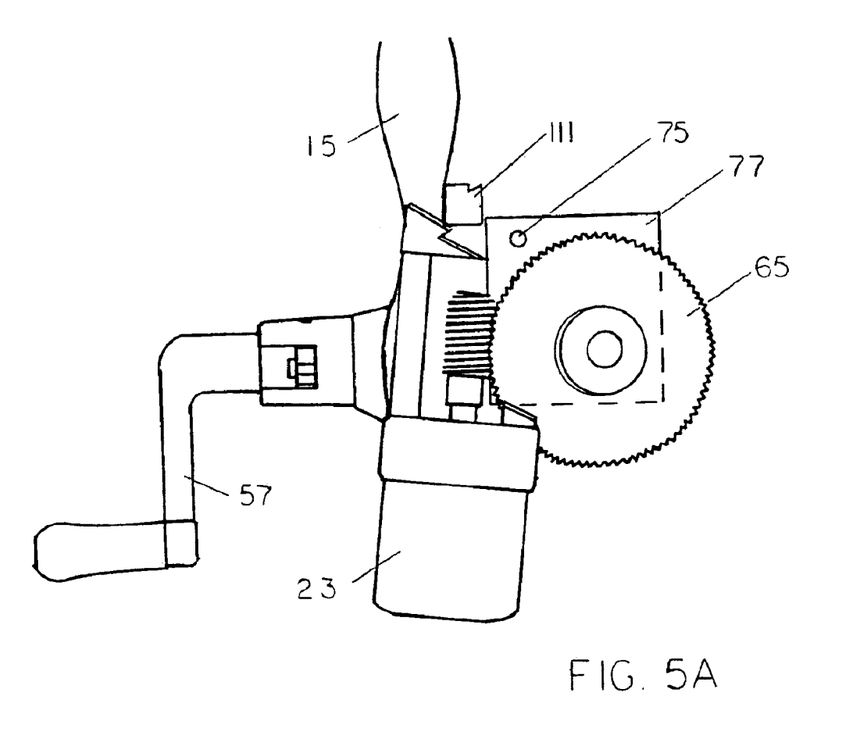
FIG. 5A is a view similar to FIG. 5 but further showing the opening in which the motor assembly rotates.

Referring now to FIG. 2 and FIG. 3, a hollow shaft 31 is mounted in the manual fishing reel 19 to rotate on bearings 33 which are mounted in an enclosure 35. The enclosure 35 as has been stated, is actually a commercially available manual fishing reel 19 which is converted to both powered and manual operation in accordance with this invention. The hollow shaft 31 has an exterior surface 37 which is cylindrical and has a concentric opening 39 through it. The hollow shaft 31 has two ends 41, namely a power end 43 and a manual end 45.

A power shuttle 47 is mounted to slide in and out of the the power end of the hollow shaft. A manual shuttle 49 is mounted to slide in and out of the manual end 43 of the hollow shaft 31. Between the power shuttle 47 and the manual shuttle 49, a shift shuttle 51 is located. The shift shuttle 51 slides back an forth inside the concentric opening 39. The shift shuttle 51 to slide without connecting to either the power shuttle 47 or the manual shuttle 49 but in contact with both the power shuttle 47 and the manual shuttle 49.

The concentric opening 39 has a multi-faced cross-sectional configuration, preferably a hexagonal shape, at least at the power end 43 and at the manual end 49. Both the power shuttle 47 and the manual shuttle 49 have an external surface 55 with the same multi-faced cross sectional as the concentric opening 39 in the hollow shaft 31. Mounted on the manual shuttle 49 is a crank handle 57. The crank handle 57 is secured to the manual shuttle 49 to rotate the manual shuttle 49. Mounted on the power shuttle 47 to rotate the power shuttle 47 is a power bevel gear 59.

The power bevel gear 59 is activated by a shaft bevel gear 61 mounted on a shaft 63. At the opposite end of the shaft 63 is a reduction gear 65 which turns the shaft 63 and the shaft bevel gear 61. The reduction gear 65 is driven by a worm gear 67 which is affixed toi the power shaft 69 of the electric motor 23. The electric motor 23 is part of a motor assembly 71 mounted on a mount shaft 73 to permit the motor assembly 71 to pivot so that the worm gear 67 can engage with and disengage from the reduction gear 65. The motor shaft 73 pivots in an opening 75 which is located within a support frame 77 which is affixed to the manual fishing reel to provide a structure for the power assembly 21. The motor assembly 71 is weighted to move the worm gear 67 toward the reduction gear 65.

Figures 6, 6A:
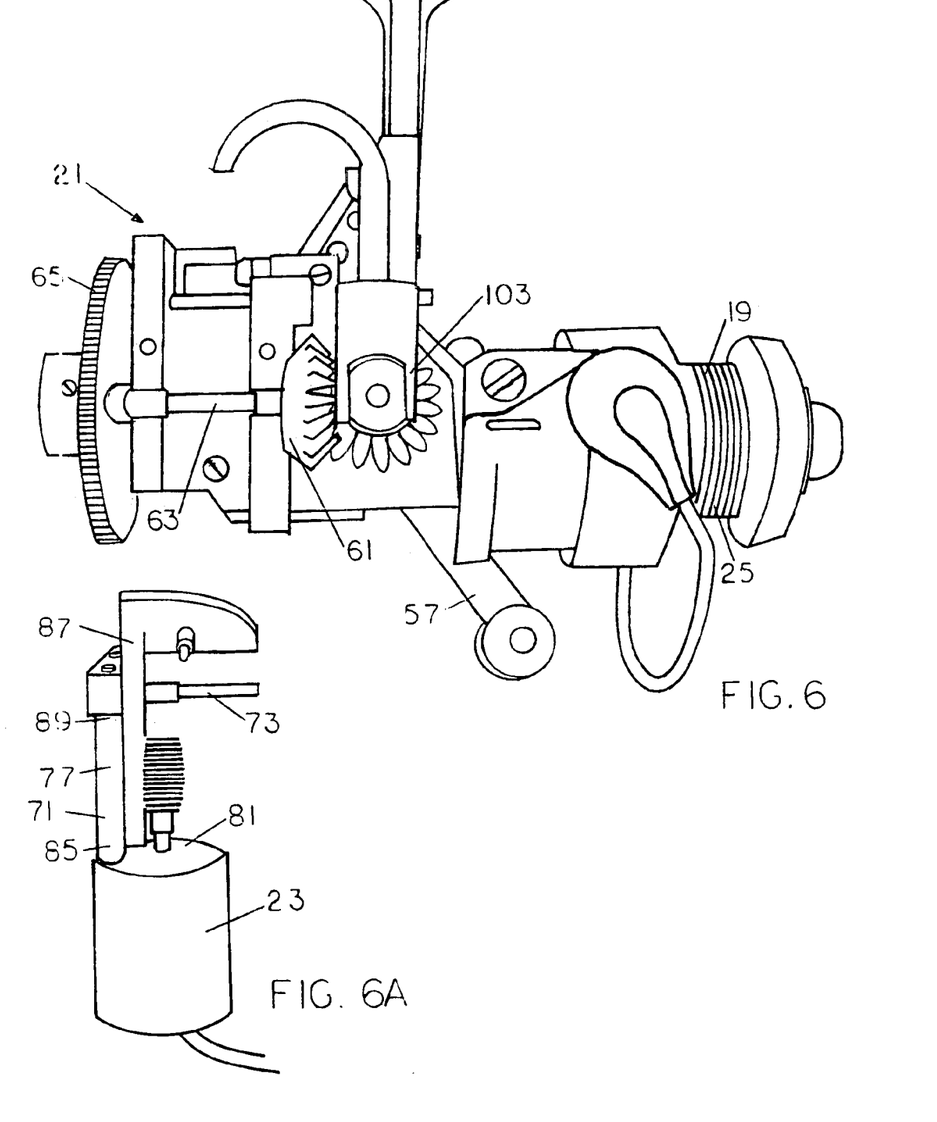
FIG. 6 is a front elevation of the fishing reel showing the finger grip for engaging and disengaging the bevel gears.
FIG. 6A is a front elevation showing the worm gear and the motor assembly detached from the fishing reel.
Figure 7:
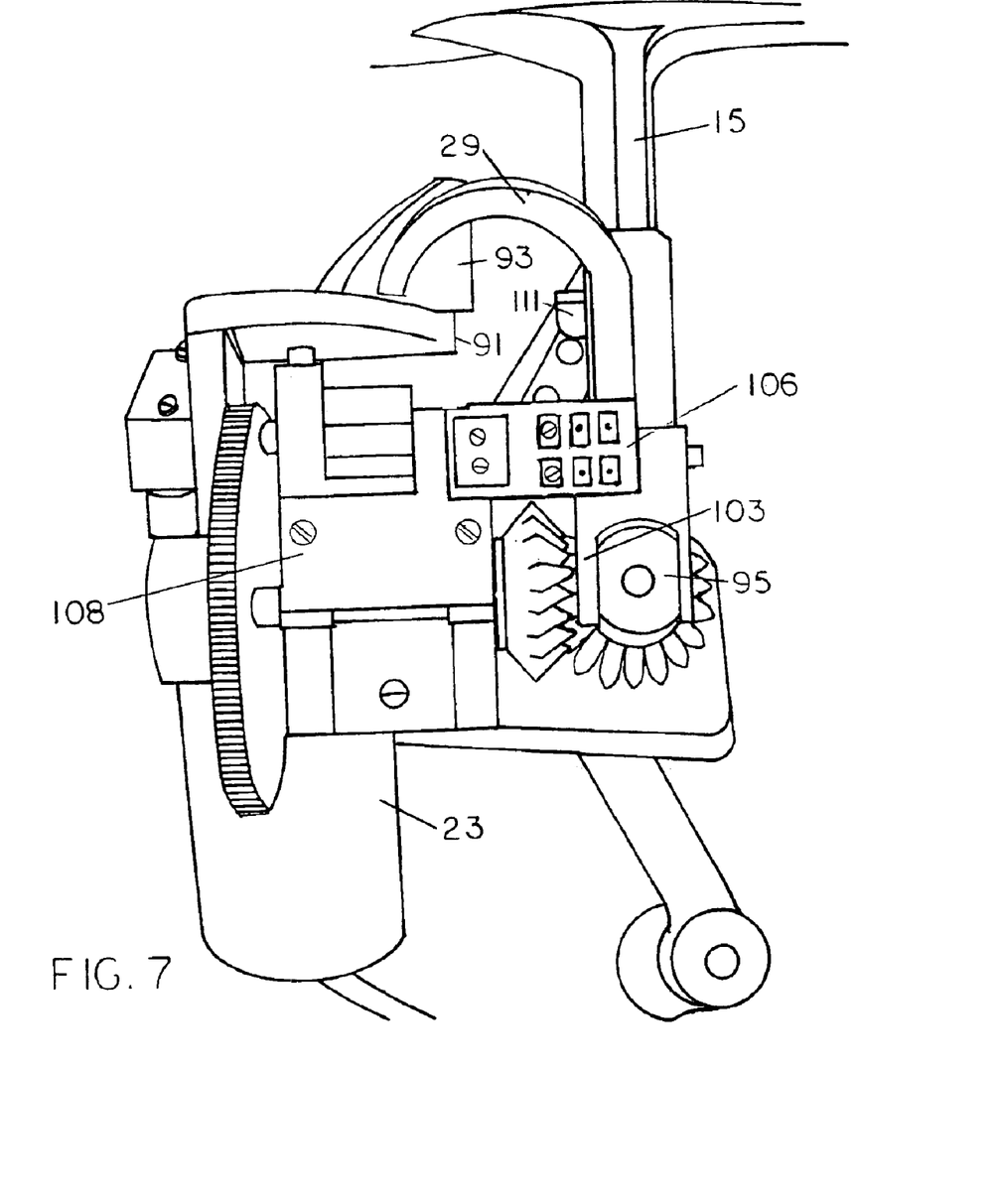
FIG. 7 is a front elevation similar to FIG. 6 but with the motor assembly in place and showing the interaction of the pad which is included in the motor assembly engaging the finger hook.
Figure 8:
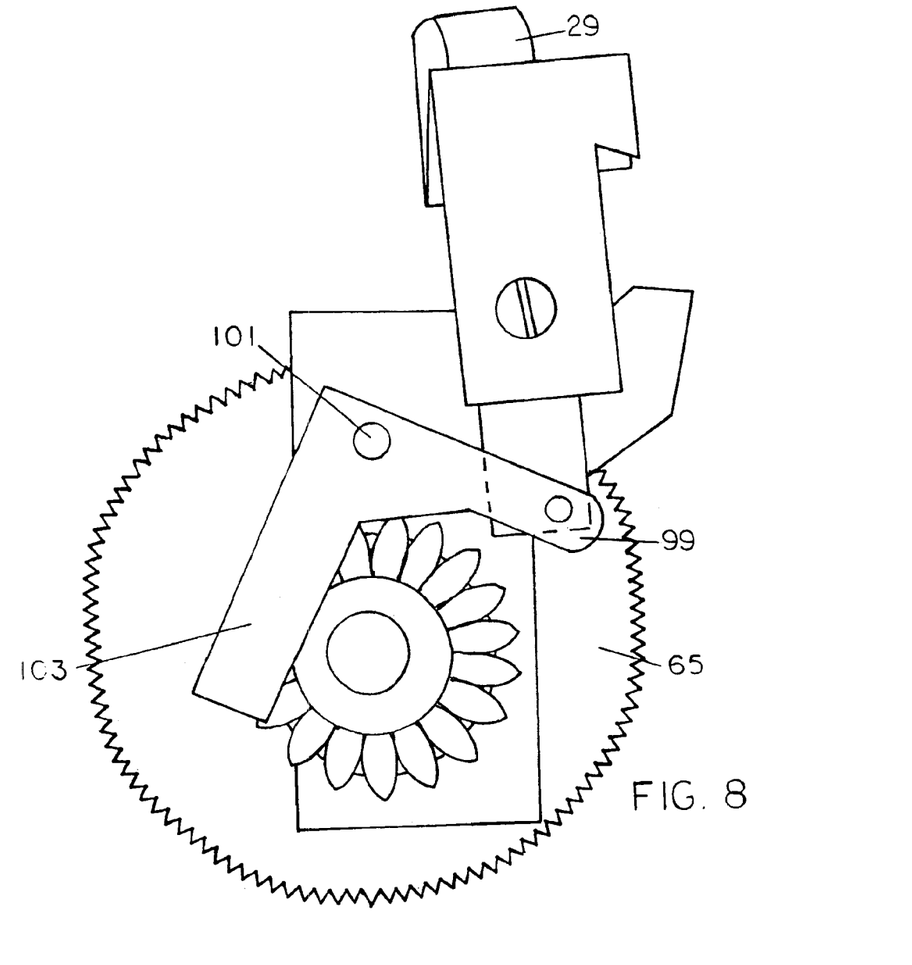
FIG. 8 is a side elevation of the finger hook with the bevel gear and reduction gear.
Figure 9:
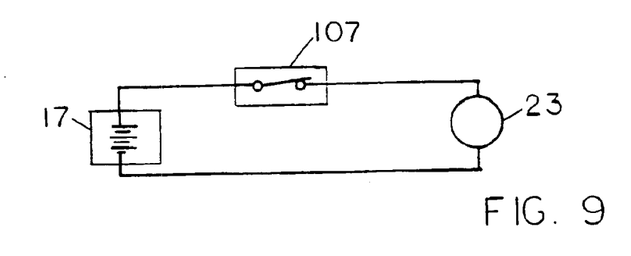
FIG. 9 is schematic electrical circuit for the electrically powered fishing reel.

As part of the motor assembly (FIG. 6) a face plate 81 is mounted on the electric motor 23 with the power shaft 69 extending through it. The face plate 81 has an outer edge 83. Two support rods 85 extend beyond the worm gear 67 and in a spaced relationship to the power shaft 69 and worm gear 67. The two support rods 85 provide structure for the motor assembly 71. The two support rods 85 are parallel to one another and parallel to the power shaft 69. An upper member 87 is secured to the ends 89 of the two support rods 85 remote from the electric motor 23. The mount shaft 73 extends from the two support rods 85 at a point-beyond the worm gear 67 toward the upper member 87 and generally at right angles to the worm gear 67. At the edge 91 of the upper member 87, remote from the electric motor 23, is a pad 93 which extends generally at right angles to the upper member 87.

A hub 95 is mounted on the power shuttle 47. A contact 97 is used to activate the electric motor 23 when the hub 95 is used to engage the power shuttle 47 with the hollow shaft 81. A linkage 99 engages the hub 95 to move the hub 95 and the power shuttle 47 into and away from the hollow shaft 51. The linkage 99 is mounted on a pivot point 101. The linkage 99 (FIGS. 2, 3, 6, 7 and 8) is a L-shaped member mounted to pivot at the center with the finger hook 29 at one end and with prongs 103 to engage the hub 95. A linkage spring 105 forces the linkage 99 to pull the hub 95 and the power shuttle 47 away from the hollow shaft 31.

A circuit board 106 (FIG. 7) is connected to a switch 107 which is located adjacent the contact 97 and when the hub 95 is in the retracted position from the hollow shaft 31, the switch 107, which is normally closed. Is opened by the contact 95 when the finger hook 29 is withdrawn and the hub 95 and power shuttle 47 are moved toward the hollow shaft 31 to engage the power shuttle 47 with the hollow shaft 31. The cicuit board 106 is mounted on a plate 108. When the switch 107 is closed, the electric motor 23 is actuated. Since the activation of the electric motor 23 is simultaneous with the engagement of the power shuttle 47 with the hollow shaft 31, the hollow shaft 31 is rotated by the electric motor 23. More specifically, as the worm gear 67, which is mounted on the power shaft 69, turns it actuates the reduction gear 65 thereby turning the shaft 63 and the shaft bevel gear 61 and the power bevel gear 59.

Figure 11:
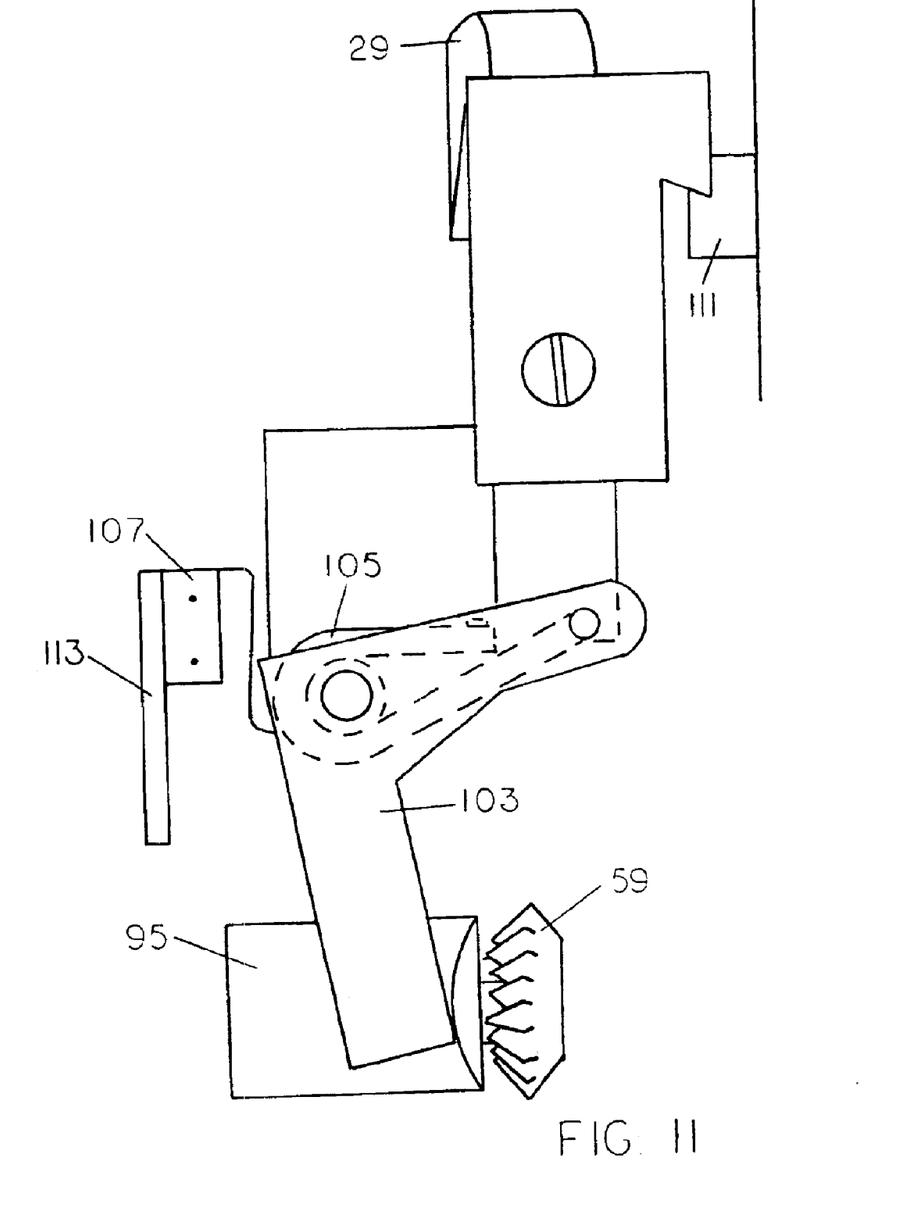
FIG. 11 is a view similar to FIG. 10 but with the finger hook held on the pawl.

As has been previously discussed, when the finger hook 29 is held in its extended position by placing a notch 109 in the finger hook 29 on a pawl 111. When the finger hook 29 is pulled out and the notch 109 is placed on the pawl 97, the finger hook 29 comes into contact with the pad 93 which rotates the motor assembly 71 about the mount shaft 73. This rotation moves the worm gear 67 against the reduction gear 65 which causes the electric motor 23 to drive the shaft 63 and the hollow shaft 31.

Figure 10:
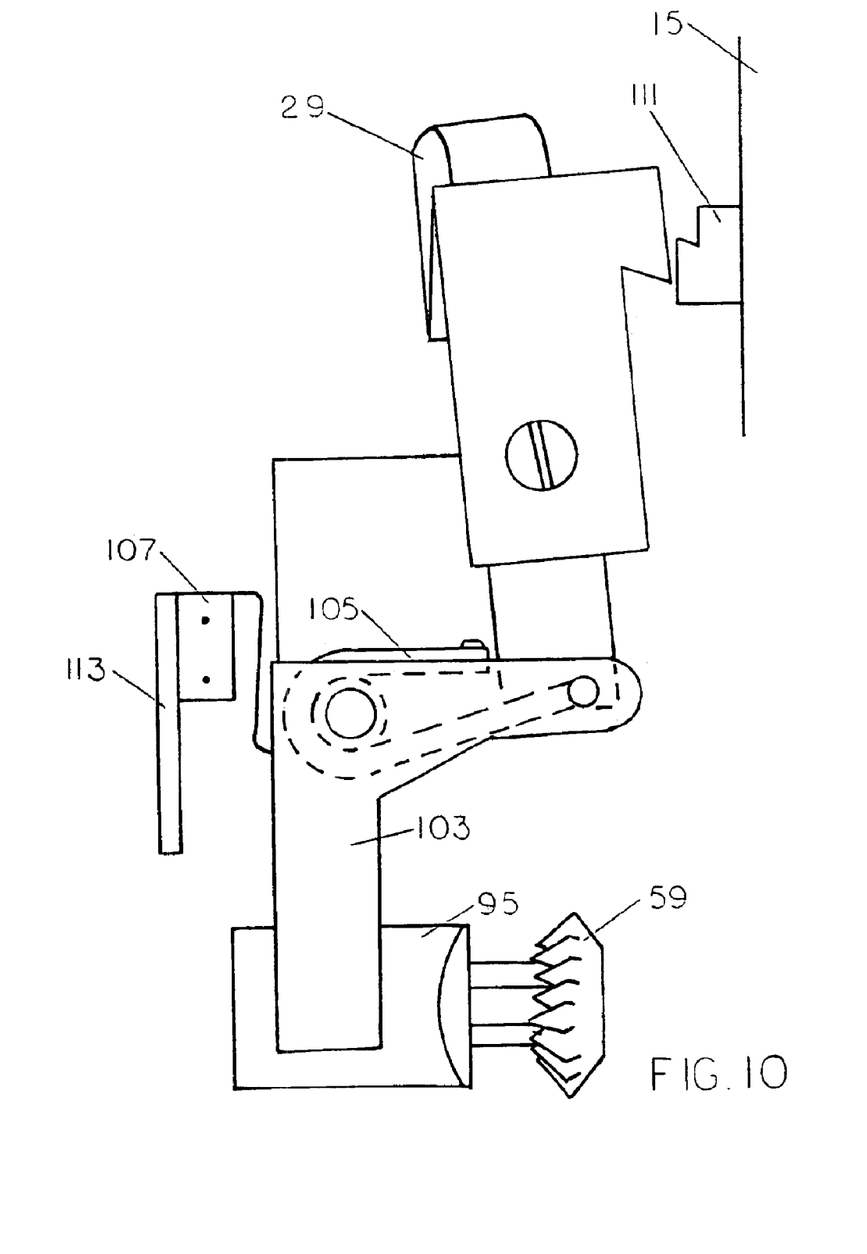
FIG. 10 is a side elevation similar to FIG. 8 but showing the power bevel gear and the switch with the finger hook off the pawl.

The interaction of the sorm gear 67 and the reduction gear 65 is limited in strength to provide for the raising of the fishing line 27 only when the fishing line 27 is empty. The engagement between the worm gear 67 and the reduction gear 65 is not sufficiently strong as to retain the engagement whould a fish or other object place a load on the fishing line 27. When a load on the fishing line 27 does occur, the electric motor 23 pivots on the mount shaft 73 causing the pad 93 to move the finger hook 29 so that the notch 109 moves off the pawl 111. The linkage spring 105 moves the linkage to the inactive position causing lthe contact 97 to open the switch 107 turning off the electric motor 23 and withdraw the hub 95 and the power shuttle from the hollow shaft 31. The manual shuttle can then be placed into the hollow shaft 31 and the crank handle 57 be used to operate the fishing reel. The switch 107 is mounted on a switch plate 113.

It is to be understood that the drawings and description matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. A powered fishing reel which permits both motorized operation and manuel operation of the fishing reel, the powered fishing reel comprising:
    an enclosure;
    a spool mounted to rotate on the enclosure;
    a hollow shaft having a power end and a manual end mounted to rotate in the enclosure, the hollow shaft having a concentric opening through it;
    means connecting the hollow shaft with the spool to rotate the spool;
    a manual shuttle mounted to slide into and out of the concentric opening at the manual end of the hollow shaft and to engage the hollow shaft to rotate the hollow shaft;
    a crank handle mounted on the manual shuttle;
    a power shuttle mounted to slide into and out of the concentric opening at the power end of the hollow shaft to rotate the hollow shaft;
    means to remove the manual shuttle from the hollow shaft when the power shuttle engages the hollow shaft;
    a motor assembly including an electric motor and an upper member and a mount shaft, the mount shaft being mounted to rotate in the enclosure;
    a gear assembly mounted in the enclosures the gear means being connected to the power shuttle;
    an electrical circuit including a switch and a power source, the electrical circuit being connected to the electric motor to energize the electric motor, the electric motor, having a power shaft, a gear being mounted on the power shaft; and
    means to actuate the switch and engage the gear mounted on the power shaft with the gear assembly and the power shuttle with the hollow shaft.

2. A powered fishing reel according to claim 1 wherein the concentric opening in the hollow shaft has a multi-faced cross section.

3. A powered fishing reel according to claim 1 wherein the concentric opening in the hollow shaft has a hexagonal cross section.

4. A powered fishing reel according to claim 1 wherein the concentric opening in the hollow shaft has a multi-faced cross section and the external surface of the power shuttle is multi-faced.

5. A powered fishing reel according to claim 1 wherein the concentric opening in the hollow shaft has a multi-faced cross section and the external surface of the manual shuttle is multi-faced.

6. A powered fishing reel according to claim 1 wherein the concentric opening in the hollow shaft has a multi-faced cross section and the external surface of the power shuttle the external surface of the power shuttle are both multi-faced.

7. A powered fishing reel according to claim 1 wherein the motor assembly further includes two rods extending from the electric motor to the upper member, the mount shaft being substantially located at a right angle to the two rods.

8. A powered fishing reel according to claim 1 wherein the electric motor in the motor assembly has the power shaft and a face plate mounted on the electric motor about the power shaft and wherein the motor assembly further includes two rods connecting the face plate to the upper member and the mount shaft is located substantially at a right angle to the two rods, the mount shaft being secured to the upper member.

9. A powered fishing reel according to claim 1 wherein the gear assembly includes a shaft with a reduction gear mounted on the shaft at one end and a shaft bevel gear mounted at the other end of the shaft.

10. A powered fishing reel according to claim 1 wherein the means to actuate the switch and engage the gear mounted on the power shaft with the gear assembly and the power shuttle with the hollow shaft includes a finger hook assembly having an L-shaped linkage and a finger hook for actuating the L-shaped linkage and a finger hook for actuating the L-shaped linkage, the L-shaped linkage further includinjg prongs.

11. A powered fishing reel which permits both motorized operation and manual operation of the fishing reel, the powered fishing reel comprising:
    a hollow shaft having a power end and a manual end mounted to rotate in an enclosure, hollow shaft having a concentric opening through it, the concentric opening having a multi-faced cross section;
    means connecting the hollow shaft with a drum to rotate the drum;
    a shift shuttle slidably mounted in the concentric opening between the power end and the manual end;
    a manual shuttle mounted to slide into and out of the concentric opening at the manual end of the hollow shaft and having an external surface with a configuration to engage the concentric opening;
    a crank handle on the manual shuttle;
    a power shuttle mounted to slide into and out of the concentric opening at the power end of the hollow shaft and having an external surface with a configuration to engage the concentric opening, the power shuttle moving the shift shuttle and the shift shuttle forcing the manual shuttle out of the hollow shaft;
    a power bevel gear mounted on the power shuttle;
    a gear assembly mounted in the enclosure, the gear assembly including a shaft bevel gear at one end and a reduction gear at the other end, the shaft bevel gear engaging the power bevel gear,
    a motor assembly including an electric motor with a power shaft at one end and an upper member at the other end and structural means connecting the electric motor with the upper member, the motor assembly further including a mount shaft located substantially at a right angle to the power shaft and toward the upper end from the power shaft and toward the upper member from the power shaft, a worm gear mounted on the power shaft;

a pad mounted on the upper member extending above the upper member, a gear assembly mounted to rotate in the enclosure including a shaft and a rotational gear and a shaft bevel gear, the shaft bevel gear engaging the power bevel gear;

an electrical circuit including a switch and a power source, the electrical circuit being connected to the elelctric motor to actuate the electric motor;

a finger hook assembly to move a contact to close the switch and to rotate the motor assembly to engage the worm gear with the reduction gear and to slide the power shuttle into the hollow shaft.

12. A powered fishing reel which permits both motorized operation and manual operatin of the fishing reel, the powered fishing reel comprising:

an enclosure;

a spool mounted to rotate in the enclosure;

a hollow shaft having a power end and a manual end mounted to rotate in the enclosure, the hollow shaft having a concentric opening through it, the concentric opening having a multi-faced cross section;

means connecting the hollow shaft with the spool to rotate the spool;

a shift shuttle slidably mounted in the concentric opening between the power end and the manual end;

a manual shuttle mounted to slide into and out of the concentric opening at the manual end of the hollow shaft and having an external surface with a configuration to engage the concentric opening;

a crank handle mounted on the manual shuttle;

a power shuttle mounted to slide into and out of the concentric opening at the power end of the hollow shaft and having an external surface with a configuration to engage the concentric opening;

a motor assembly including an electric motor with a power shaft at one end and an upper member at the other end, a face plate being mounted on the electric motor about the power shaft, two rods connecting the face plate to the upper member, a mount shaft located substantially at a right angle to the two rods and the power shaft and being secured to the upper member, the mount shaft being mounted to rotate in the enclosure, a worm gear being mounted on the power shaft;

a power bevel gear mounted on the power shuttle to rotate with the power shuttle, the power shuttle slidably engaging the power bevel gear;

an electrical circuit including a normally-closed switch and power source, the electrical circuit being connected to the electrc motor to actuate the electric motor;

a gear assembly including a shaft, a reduction gear mounted on the shaft at one end and a shaft bevel gear mounted at the other end of the shaft, the shaft being mounted to rotate in the enclosure;

a finger hook assembly including an L-shaped linkage and a finger hook with a notch in it for actuating the L-shaped linkage, the L-shaped linkage further including prongs, the finger hook assembly having an actuated position and an inactive position;

a hub, the power shuttle being mounted to rotate in the hub, the prongs of the I-shaped linkage engaging the hub;

a pawl, the notch of the finger hook engaging the pawl when the finger hook is held in the activated position, the finger hook engaging the pad on the motor assembly to rotate the motor assembly on the mount shaft moving the worm gear the contact with the reduction gear, the prongs sliding the power shuttle into the hollow shaft, the power shuttle pushing the shift shuttle which pushes the manual shuttle out of the hollow shaft;

a contact actuated by the hub to close the switch to actuate the electric motor, the engagement between the worm gear and the reduction gear being adapted to cause the motor assembly to rotate away from the reduction gear and a pad to move the finger hook off the pawl; and a linkage spring to return the linkage assebly to its inactive position disengaging the power shuttle from the hollow shaft and opening the normally-closed switch.

* * * * *